United States Patent
Landragin et al.

(10) Patent No.: US 8,525,699 B2
(45) Date of Patent: Sep. 3, 2013

(54) DEVICE FOR AIDING FLIGHT FOR AN AIRCRAFT

(75) Inventors: Thomas Landragin, Valence (FR); Christian Nouvel, Merignac (FR)

(73) Assignee: Thales, Neuilly sur Seine (FR)

( * ) Notice: Subject to any disclaimer, the term of this patent is extended or adjusted under 35 U.S.C. 154(b) by 351 days.

(21) Appl. No.: 13/052,773

(22) Filed: Mar. 21, 2011

(65) Prior Publication Data

US 2011/0254707 A1    Oct. 20, 2011

(30) Foreign Application Priority Data

Mar. 23, 2010  (FR) ...................... 10 01150

(51) Int. Cl.
*G08G 1/095*    (2006.01)

(52) U.S. Cl.
USPC ........... 340/907; 340/905; 340/684; 340/961; 340/971; 340/979; 701/454; 701/455; 701/467; 701/483

(58) Field of Classification Search
USPC ................ 340/907, 905, 684, 961, 971, 979; 701/454, 455, 467, 483
See application file for complete search history.

(56) References Cited

U.S. PATENT DOCUMENTS

| | | | | |
|---|---|---|---|---|
| 6,112,141 | A  * | 8/2000 | Briffe et al. ..................... | 701/14 |
| 6,199,015 | B1 * | 3/2001 | Curtwright et al. ........... | 701/455 |
| 7,072,746 | B1   | 7/2006 | Burch | |
| 8,264,378 | B1 * | 9/2012 | Martins et al. ................ | 340/979 |

FOREIGN PATENT DOCUMENTS

EP    2 072 956 A2    6/2009

* cited by examiner

*Primary Examiner* — Tai T Nguyen
(74) *Attorney, Agent, or Firm* — Baker Hostetler LLP

(57) ABSTRACT

A device for aiding flight for an aircraft includes means for locating the localities situated in the operational area for rescue missions. The device is able to present to the crew a landmark of the positions of the localities in relation to the position of the aircraft, this landmark also indicating information connected with navigation and to flight regulations for each of the localities. The device relates to operations aircraft and more particularly rescue helicopters.

11 Claims, 3 Drawing Sheets

US 8,525,699 B2

DEVICE FOR AIDING FLIGHT FOR AN AIRCRAFT

CROSS-REFERENCE TO RELATED APPLICATIONS

This application claims priority to foreign French patent application No. FR 10 01150, filed on Mar. 23, 2010, the disclosure of which is incorporated by reference in its entirety.

FIELD OF THE INVENTION

The invention relates to devices for aiding flight for an aircraft, in particular for rescue missions.

BACKGROUND OF THE INVENTION

During civilian safety missions of rescue type such as human recovery on a road after an accident, helicopters operate in an isolated spot without any precise landmark for pinpointing the site of operations, for example an injured person in a field where the only given landmarks are the names of the villages in the vicinity. The problem faced by the pilot in missions of this kind is to be able to easily obtain a fix on his location permanently with respect to surrounding features since he does not have the precise position of the site of operations. This is so, whether it be during the flight, where the pilot seeks to ascertain his location permanently with respect to the vicinity, for example to know which village it is that he spots from afar (knowing that all the small villages in the region may resemble one another) or at the end of the flight on approaching the final destination, where the pilot seeks characteristic features allowing him to better ascertain his location with respect to the site of the accident.

The problem is rendered complex during these missions by the fact that all these locating actions must be performed while ensuring flight safety and compliance with flight regulations, notably the permitted minimum altitude for overflying a village. Now, this locating is rendered difficult by the fact that it takes place in an isolated spot, accentuated by the fact that the people on the ground may have few visual features for indicating to the helicopter where they are. This difficulty of locating is all the more acute when operations proceed under unfavourable weather conditions, since visual locating is a compulsory step in this type of mission.

Today, the helicopters used for these missions are helicopters equipped with sophisticated flight assistance devices. However, their equipment does not make it possible to solve the aforementioned problems in respect of missions of such a type. Indeed, the content and the precision of their database, their information display zooms, their system waypoints, are optimized for missions of long distance type under instrument flight rules. However, no precise databases of the site being searched for exist when dealing with local missions, and pilots do not have useful information for getting to the right spot, for identifying it dependably and for putting down correctly. Therefore, when they locate a small village, it is hard for them to know whether it is the destination village or the neighbouring village. As an aid to help them get a fix on their location, pilots often use NGI (National Geographic Institute) paper maps of the region initially provided for use in cars and/or by ramblers. They locate secondary roads (across counties for example), railway tracks, streams and other characteristic features close to the villages being searched for (cemeteries, water towers for example).

Moreover, the use of a satellite navigation device (GPS for "Global Positioning System") would only partly solve the problem, since in isolated areas, situated between two villages for example, the GPS device does not allow a location fix to be obtained readily.

These difficulties require several sources of information in order to be certain, this taking time, of the fuel required in conditions of visibility "at the permitted limits". This search is all the longer as the pilot must in parallel continue to pilot manually, to monitor the fuel, the local weather and potentially dangerous obstacles, all at low altitude. Now, a helicopter's range for this type of mission is often reduced, and the success of the mission thus depends on the pilot's swiftness in reaching the site of operations. These difficulties sometimes involve mission cancellations, in as much as the pilot experiences difficulties in obtaining a fix on his location, in putting down and in returning to base with limited fuel reserves.

Other problems specific to aeronautics come into play for which the GPS device does not offer any effective solution and may even be a disturbing element in relation to the management of these problems by overly attracting the pilot's attention. Fuel management is paramount in order to know whether the fuel level is sufficient to get to the site of operations and to return to the departure base. Regulations demand that a reserve of 20 flying minutes be conserved for example. Moreover for these missions, the fuel given is often limited and the pilot has little margin for manoeuvre in his mission.

Weather management is difficult to ensure at the same time as the piloting and locating tasks. The crew must comply with a maximum speed which is dependent on the visibility distance. The worse the visibility, the lower the speed of translation and as a direct consequence the larger the drift due to the wind. In a phase of putting down in a field, the orientation of the wind with respect to the helicopter is very important.

The management of obstacles is specific to helicopters which fly at low altitude and therefore very exposed to electrical lines and to isolated obstacles for example. Moreover account must be taken of obstacles in front and behind (travelling backwards being another specific feature of helicopters). This management is very important in a low altitude recognition phase just before putting down in a field with a severe time constraint when a serious injury is awaiting attention.

The management of regulations is also a problem to be taken into account, notably the regulatory altitude to be complied with in the case of overflying a district. This overfly altitude depends on the extent of the district in question.

SUMMARY OF THE INVENTION

An objective of the present invention consists in assisting the crew in carrying out operational missions, notably so as to facilitate the locating of the landing area and to guarantee flight safety.

More precisely, the invention relates to a device for aiding flight for an aircraft comprising means for reading the aircraft's navigation data and display means able to represent the position and the current heading of the aircraft by a stationary marker in the central part of the display area. It also comprises a database containing topological and photographic information representative of the localities of a geographical area so as to display at the periphery of the central part of the display area at least one tag containing information representative of a locality and flight management information for reaching the locality, at least one photographic representation and at least one topological representation of a locality and in that the said tag is positioned in the peripheral area in relation to the stationary marker in such a way that the position of the tag with respect to the stationary marker represents the position of the locality in relation to the current position of the aircraft.

Preferably, the peripheral area is divided into at least two sectors in which an information tag is positioned, the said tag being stationary in the sector.

Preferably, a tag representative of the destination locality is displayed in the upper part of the display area.

Preferably, a tag representative of the departure locality is displayed in the lower part of the display area.

According to a variant of the invention, a synthetic representation of the exterior environment of the aircraft in a relative view with respect to the position and the current heading of the aircraft is displayed in the central part of the display area overlaid on the stationary marker.

According to a variant of the invention, the stationary marker is a heading indicator.

According to a variant of the invention, an information tag comprises the following information:
 The name and the geographical area indicator of the locality;
 The route to be followed to reach the locality;
 The distance and the duration required in order to reach the locality according to the current speed of the aircraft;
 A fuel indicator indicating whether the fuel aboard is sufficient to get to the locality and to get to the locality and return to the departure base;
 The weather Information: origin and speed of the wind;
 The visibility distance and the maximum speed permitted by regulations.

According to a variant of the invention, the photographic representation of a locality is positioned in proximity to the tag representing the locality.

According to a variant of the invention, the photographic representation is a representation of the locality seen according to the aircraft's approach route.

According to a variant of the invention, the topological representation of a locality is positioned in proximity to the tag representing the locality and comprises topological landmarks of the locality positioned with respect to one another as a function of the aircraft's approach route.

According to a variant of the invention, the database comprises the following topological landmarks: roadway, railway track, waterway, cemetery, extent of the locality.

The invention presents the advantage of providing in a synthetic manner the essential information for carrying out the rescue mission. The device for aiding flight allows the pilot to obtain a fix on his location easily with respect to the nearby localities and to thus reach the operational area effectively in terms of fuel and time. The tags disposed in relation to the current position of the aircraft are an aid to locating and the information contained in these tags provides the essential information connected with navigation, regulations and the weather. Thus, the pilot need no longer resort to various information sources such as the GPS device and the NGI maps to carry out the locating task.

Moreover, the photographic and synthetic representations of the destination locality allow the pilot to obtain a fix on his location more precisely during the approach to the operational area by virtue of the easily identifiable topological landmarks disposed relative to one another along the aircraft's approach route. These topological features make it possible to reduce the time taken to arrive at the operational area since they are easily identifiable while flying by sight.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
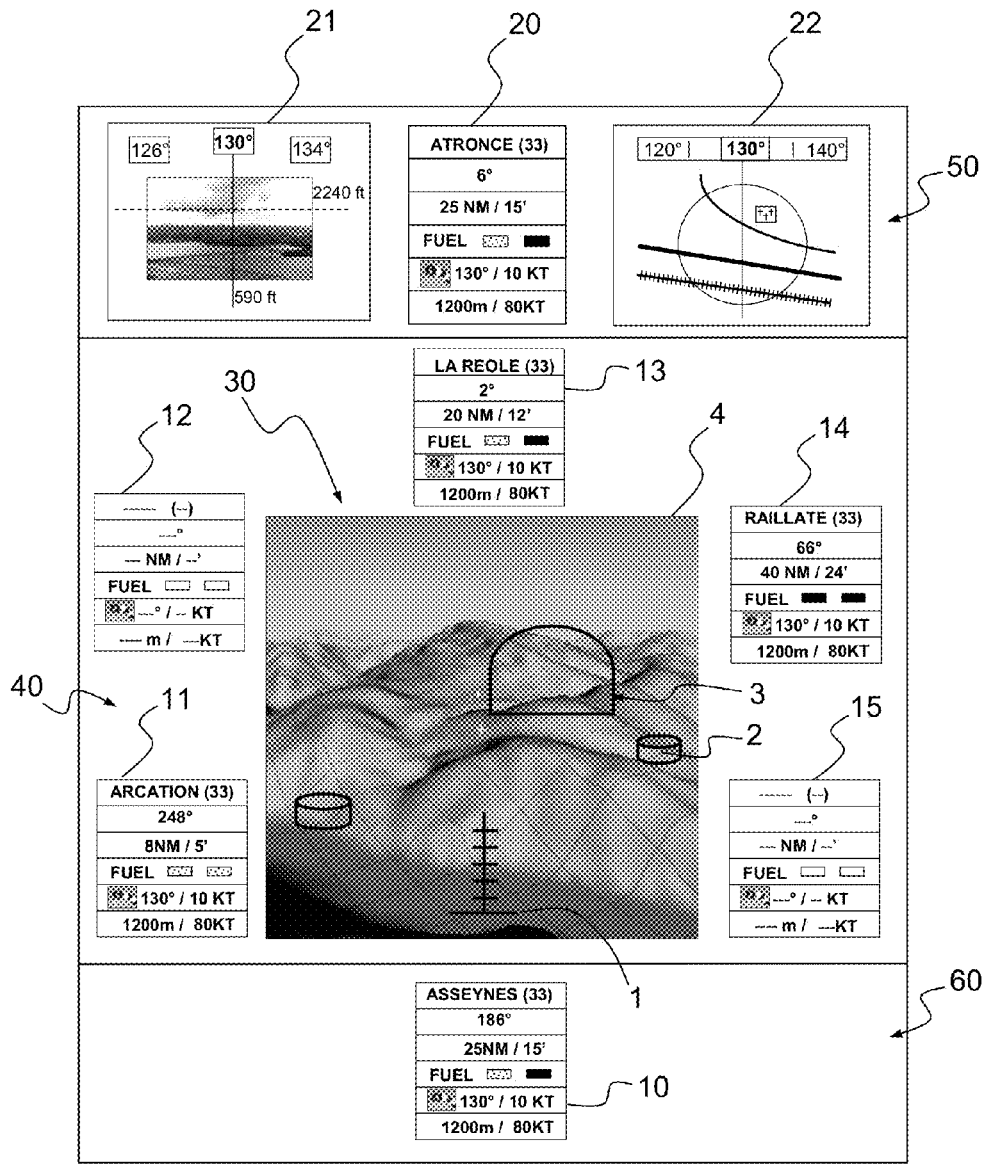
FIG. 1 represents an exemplary display presented by the device for aiding flight according to the invention. The viewing device presents a synthetic view of the exterior environment and the information for aiding flight at the periphery of the said synthetic view.

The invention consists in proposing an aircraft flight aid function implemented by an onboard computer able to process navigation data, information connected with flight regulations and information connected with localities situated in a given geographical area. The data arising from the processing of the information are presented to the crew by means of a display device in interaction with the said crew. A display device may be an MFD ("Multi Function Display") screen. Any type of display device known from the prior art may be envisaged for information presentation and the display device used does not present any limiting character within the scope of the invention. It is also possible to envisage the implementation of the invention with a projection-based head-up display.

The objective of this function is to present information so as to undertake navigation by sight, by aiding the pilot to recognize the relevant elements of the scene of operations so that he can get a relative fix on his location with respect to these elements, doing all this while ensuring flight safety by presenting him, in an intuitive manner, with the necessary information about fuel, weather, obstacles and overfly altitude.

A means necessary for the implementation of this function is notably the making available of a database containing the following information elements: the list of French districts: name, county, latitude, longitude, extent, altitude of the district (often taken at the level of the town hall), overfly altitude; the terrain information (altitude, obstacles); for each district: one or more photos of the district, taken at altitude, where it is possible to easily identify visual landmarks (roads, streams, railway tracks, cemeteries); information about the position of the characteristic features of the district (by way of nonlimiting example roads, streams, railway tracks, cemeteries).

This database differs from the customary databases through the following two aspects: on the one hand it contains more precise locating elements regarding the local villages, and on the other hand the need as regards terrain positioning precision is not critical. Indeed, a precision of about ten metres is amply sufficient. What is sought is the relevance of the information as well as the relative position of one element with respect to another. Likewise, the photos present do not need to be in colour, a black and white photo is amply sufficient to locate the characteristic features. Indeed, a black and white photograph presents the advantage of reducing the memory size occupied by the photographs in comparison with a colour photograph database and furthermore, it is closer to the reality observed by the pilot in the case of poor weather and it allows better locating of the characteristic features. Moreover with a view to reducing the memory capacity dedicated to photographs, it is not necessary to store the photographs of all the districts of the territory since a craft operates only in a given geographical area. The database can limit itself to the localities of the area of operation of a craft.

The aircraft's navigation data such as the current position, the current heading, the fuel level and the estimations of flight time remaining in relation to the fuel remaining and the configuration of the craft (weight, number of passengers for example) may be read by means of the equipment for interfacing between the avionics systems and the computation means implementing the functions of the device for aiding flight. The aircraft's navigation management system is the computer which generally makes it possible to read these real-time data during the flight.

FIG. 1 represents a first mode of display of the invention on an interface of the cockpit. The function is displayed on a single screen of MFD type. A stationary marker 1 is positioned on the central part 30 of the display area. This marker is a substantially vertical bar such as to indicate the current heading of the aircraft. This marker also indicates the current position of the aircraft. In this central part 30 of the display area is represented a synthetic view 4 of the environment close to the aircraft. It is a relative view according to the aircraft's flight deck. The implementation of a synthetic vision system is known from the prior art and does not represent a limitation of the invention. Synthetic vision systems are used to assist the pilot when he is navigating under conditions of low visibility. According to another mode of display the stationary marker is represented only in the central part 30 of the display area. The synthetic view 4 represents the terrain in 3D on which the obstacles 2 and also the overfly altitudes 3 are indicated.

This 3D representation is not a precise representation of reality. It is an aid to navigation and not a piloting means. Displaying synthetic vision presents the advantage to the pilot of a better grasp of the surrounding relief and of intuitively locating the elements that are specific to helicopter piloting (obstacles and the overfly altitudes). Flight regulations stipulate that a village be overflown above a minimum overfly altitude. This regulated flight area is represented for example by a dome 3 around a village. This information may be obtained from the localities information database.

During the flight, the task of locating around the nearby localities is facilitated by the display of information tags 11 to 15 representing the localities in the geographical area. In this mode of display five tags 11, 12, 13, 14 and 15 are positioned circularly in the peripheral area 40 surrounding the stationary marker 1 and consequently surrounding the central part 30. The peripheral area 40 is divided into several sectors, five sectors in the case of FIG. 1. A tag is positioned in a sector and is advantageously stationary inside this sector so as to avoid permanent displacements of these tags. FIG. 1 is a nonlimiting example and the number of sectors that can be displayed may be less than or greater than five and be configured by the crew. A sector delimits a route value span and the localities positioned in this flight route value span with respect to the heading of the aircraft are positioned in a tag positioned in the said sector. The size of the route value span depends on the number of sectors constituting the peripheral area 40.

Figure 2:
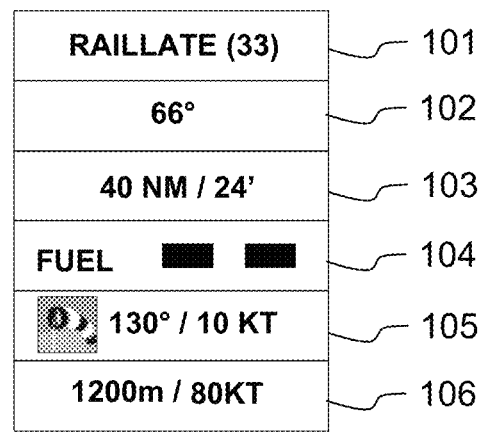
FIG. 2 more specifically describes the information presented in an information tag according to the invention.

FIG. 2 represents an information tag for a locality comprising the following necessary indications for aiding locating, which arise at one and the same time from the database of information relating to the localities, and from computations arising from information from this database and from the information regarding current navigation of the carrier such as position and flight speed:

An information field 101 indicating the name and the county of the locality;

An information field 102 indicating the route to be followed to reach the locality;

An information field 103 indicating the distance and duration of flight required to reach the locality as a function of the current speed;

An information field 104 representing a fuel indicator so as to ascertain whether the current fuel level is sufficient to get to this locality and to return to the departure base. The fuel indicator is represented by two colour labels but other modes of representation are possible, for example a display of the tag in colours or dotted as a function of the sufficiency or otherwise of the fuel or representation of the fuel in the standard form of a gauge by indicating the 2 critical elements, while indicating the reserve laid down by the regulations.

An information field 105 indicating the standard weather Information for example the origin and the speed of the wind;

An information field 106 indicating the maximum speed permitted by the regulations, this speed being dependent on the visibility distance when flying by sight.

These items of information are the indications which are essential for locating during flight and for identifying the localities present in his field of vision. The pilot can thereafter confirm the information displayed in his device for aiding flight by looking outside for the presence or otherwise of the advised locality.

Advantageously, to avoid information overload, a function for filtering the tags 11 to 15 is implemented. According to a base filtering for each sector, only a single tag is displayed, therefore the district closest to the carrier in this sector is selected. According to a second filtering termed temporal filtering, only the towns situated less than five flight minutes away as computed on the basis of the current speed are displayed. According to a third filtering termed spatial filtering, only the towns situated less than 5 NM from the carrier are displayed. In the last two filtering modes, one or more tags may be represented in one and the same sector. The number of tags depends on the display surface utilized. The filtering function may be initialized by default and/or by the pilot with the appropriate interface. If the filtering is effective, it is nevertheless useful to leave the tag displayed with empty fields or fields filled with dashes as a function of the availability of the digital information.

By virtue of the display in sectors, when updating the tags there is no need to change the content of a tag the whole time. The route indicated inside the tag varies (precise to within a degree), but not the tag itself. Thus, the updating may be carried out in a quite reasonable time (every second for example). On the other hand, in the case of a change of positioning sector of a locality or when a new locality is presented in the display, a tag is advantageously displayed by blinking for a few seconds so as to attract the pilot's attention.

Preferably, in the lower part 60 of the display area, the device for aiding flight displays a tag representing the departure locality. This tag is also stationary in this part of the display area.

Preferably, in the upper part 50 of the display area, the device for aiding flight displays a tag representing the destination locality. This tag is also stationary in this part of the display area.

Figure 3:
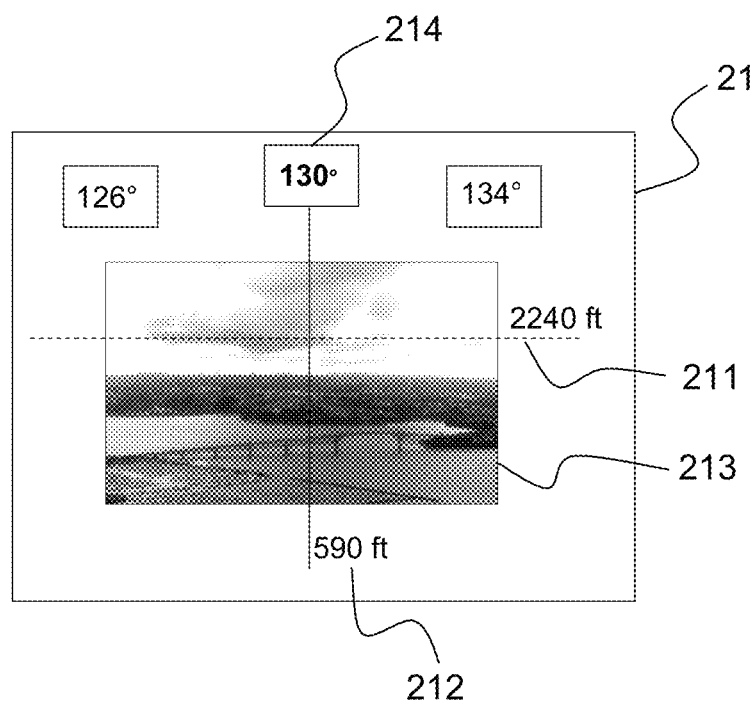
FIG. 3 represents a black and white photograph of the destination that may be presented to the pilot.

Moreover, a photograph 21 of the destination locality may be presented in this upper part 50 of the display area. FIG. 3 represents this photograph 21 in greater detail. An element 214 indicates the route according to which the photograph is seen. Preferably, the database comprises a plurality of photographs of the locality taken from various angles of view from 0 to 360°. Thus, the device for aiding flight displays the photograph according to the same angle of view as the aircraft's approach route. The regulatory overfly altitude below which it is prohibited to fly is also displayed on the photograph 213. It is also possible to display the altitude 212 of the locality.

Figure 4:
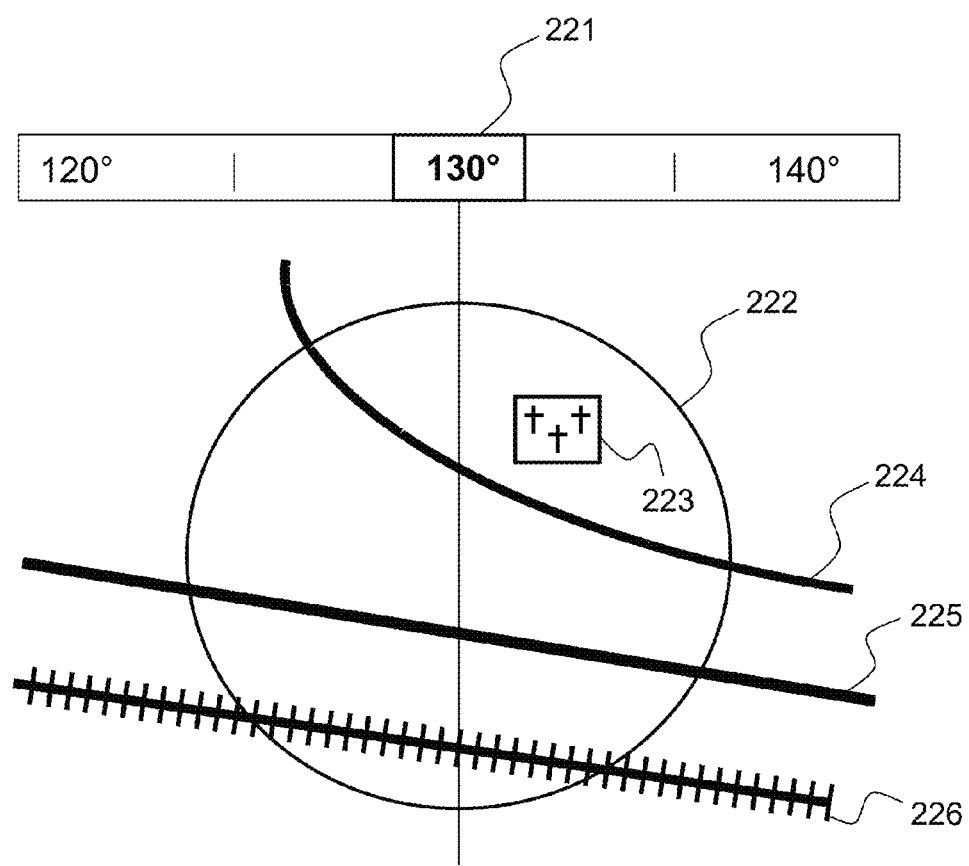
FIG. 4 represents a synthetic representation of the destination that may be displayed to the pilot to aid the locating of the operational area.

A synthetic representation 22 of the destination locality can also be presented in this upper part 50 of the display area. FIG. 4 illustrates in greater detail an example of a synthetic representation describing the positions of topological landmarks 222 to 226. The database of information relating to the localities contains topological landmarks characteristic of the locality, such as roadways, rivers or streams or a cemetery. These landmarks are chosen for their ease of identification at altitude during flight conditions under reduced visibility. These landmarks are disposed with respect to one another as a function of the aircraft's approach route 221. Thus, the crew has a simple representation making it possible to take navigation decisions rapidly. The updating of the synthetic representation 22 is such that the disposition of the topological landmarks evolves as a function of the route followed by the aircraft, similarly to a conventional compass to facilitate the pilot's understanding. FIG. 4 represents a locality defined by the circle 222 representing its extent, the position of a cemetery 223 in the locality, a stream 224, a road 225 and a railway track 226. According to the mode of display and the content of the database it is possible to display further synthetic elements of characteristic topological landmarks: churches, bridges, etc. It is also possible to indicate more information about the landmarks (name of the roads—D513, name of the rivers, etc.). If the display surface so allows, it is conceivable to also display for each locality tag 11 to 15 a photo and a synthetic representation for the nearby localities indicated in the tags.

The invention claimed is:

1. A device for aiding flight for an aircraft comprising:
    means for reading navigation data of said aircraft;
    display means to represent a position and a current heading of the aircraft by a stationary marker in a central part of a display area; and
    a database containing topological and photographic information representative of one or more localities of a geographical area so as to display at a periphery of the central part of the display area at least one tag containing information representative of a locality and flight management information for reaching said locality, wherein at least one photographic representation and a topological representation of a destination locality and in that the said tag is positioned in a peripheral area in relation to the stationary marker in such a way that a position of the tag with respect to the stationary marker represents the position of the locality in relation to the current position of the aircraft.

2. The device according to claim 1, wherein the peripheral area is divided into at least two sectors in which an information tag is positioned, said tag being stationary in the sector.

3. The device according to claim 1, wherein a tag representative of the destination locality is displayed in an upper part of the display area.

4. The device according to claim 1, wherein a tag representative of a departure locality is displayed in a lower part of the display area.

5. The device according to claim 1, wherein a synthetic representation of the exterior environment of the aircraft in a relative view with respect to the position and the current heading of the aircraft is displayed in the central part of the display area overlaid on the stationary marker.

6. The device according to claim 1, wherein the stationary marker is a heading indicator.

7. The device according to claim 2, wherein the information tag comprises the following information:
    a name and the geographical area indicator of the locality;
    a route to be followed to reach the locality;
    a distance and a duration required in order to reach the locality according to the current speed of the aircraft;
    a fuel indicator indicating whether fuel aboard is sufficient:
    to get to the locality,
    to get to the locality and return to a departure base,
    a weather information:
    origin and speed of a wind,
    a visibility distance and a maximum speed permitted by regulations.

8. The device according to claim 1, wherein the photographic representation of a locality is positioned in proximity to the tag representing the locality.

9. The device according to claim 8, wherein the photographic representation is a representation of the locality seen according to the aircraft's approach route.

10. The device according to claim 1, wherein the topological representation of a locality is positioned in proximity to the tag representing the locality and comprises topological landmarks of the locality positioned with respect to one another as a function of an approach route of the aircraft.

11. The device according to claim 10, wherein the database comprises the following topological landmarks:
    Roadway and railway track;
    Waterway;
    Cemetery;
    Extent of the locality.

* * * * *